United States Patent [19]

Okabe et al.

[11] Patent Number: 5,559,062
[45] Date of Patent: Sep. 24, 1996

[54] METHOD OF MANUFACTURING A COMPOSITE SINTERED BODY

[75] Inventors: Masanori Okabe; Yoshikatsu Higuchi; Yasunobu Kawakami, all of Saitama-ken, Japan

[73] Assignee: Honda Giken Kogyo Kabushiki Kaisha, Tokyo, Japan

[21] Appl. No.: 358,534

[22] Filed: Dec. 19, 1994

[30] Foreign Application Priority Data

Dec. 17, 1993 [JP] Japan .................................. 5-343986
Dec. 17, 1993 [JP] Japan .................................. 5-344022
Dec. 21, 1993 [JP] Japan .................................. 5-345174

[51] Int. Cl.⁶ ....................... C04B 35/571; C04B 35/589
[52] U.S. Cl. ................. 501/92; 501/97; 264/65
[58] Field of Search ........................ 501/92, 97; 264/65, 264/66

[56] References Cited

U.S. PATENT DOCUMENTS

| | | |
|---|---|---|
| 4,720,532 | 1/1988 | Seyferth et al. . |
| 4,771,118 | 9/1988 | Takamizawa et al. .............. 501/92 X |
| 4,870,035 | 9/1989 | Takamizawa et al. .............. 501/92 X |
| 4,886,860 | 12/1989 | Arai et al. . |
| 5,081,078 | 1/1992 | Vaahs et al. ........................ 501/97 |
| 5,124,283 | 6/1992 | Lebrun et al. ...................... 501/92 |
| 5,187,252 | 2/1993 | Vaahs et al. ........................ 501/92 X |
| 5,200,371 | 4/1993 | Takeda et al. ..................... 501/92 X |
| 5,229,338 | 7/1993 | Huggins ........................... 501/92 X |

FOREIGN PATENT DOCUMENTS

| | | |
|---|---|---|
| 0161751 | 11/1985 | European Pat. Off. . |
| 0344870 | 12/1989 | European Pat. Off. . |
| 0372382 | 6/1990 | European Pat. Off. . |
| 63-191832 | 8/1988 | Japan . |
| 6-466239 | 3/1989 | Japan . |
| 1-275470 | 11/1989 | Japan . |
| 381330 | 4/1991 | Japan . |
| 3-190932 | 8/1991 | Japan . |

OTHER PUBLICATIONS

WPI Abstract No. 88–261836 of Japanese Patent 63–191832 (Sep. 26 1986).

Riedel, "Sintering of Amorphous Polymer–Derived Si, N and C Containing Composite Powders, " *Journal of the European Ceramic Society*, vol. 5., No. 2, pp. 113–122 (1989) Great Britain.

Seyferth et al., "High–Yield Synthesis of $Si_3N_4$/SiC Ceramic Materials by Pyrolysis of a Novel Polyorganosilazane," *Journal of the American Ceramic Society*, vol. 67, No. 7, pp. C132–C133 (1984) Columbus, Ohio.

*Primary Examiner*—Karl Group
*Attorney, Agent, or Firm*—Birch, Stewart, Kolasch & Birch, LLP

[57] ABSTRACT

An yttrium-containing composite powder for use as a material of a silicon nitride/silicon carbide composite sintered body is produced by thermally decomposing yttrium-containing polysilazane having an Si—N bond and an Si—C bond and an Si—O—Y bond and/or an N—O—Y bond in molecules thereof in an inert gas atmosphere or a vacuum at a temperature of at least 800° C., and grinding the thermally decomposed yttrium-containing polysilazane.

15 Claims, 2 Drawing Sheets

ABOUT 500 nm

ABOUT 500 nm

METHOD OF MANUFACTURING A COMPOSITE SINTERED BODY

BACKGROUND OF THE INVENTION

1. Field of the Invention

The present invention relates to a yttrium-containing composite powder, a composite sintered body formed from such a composite powder, and a method of manufacturing such a composite powder and a composite sintered body.

2. Description of the Related Art

Sintered bodies composed mainly of silicon nitride and silicon carbide are finding wide use as various structural ceramic materials as substitutes for metallic materials because they are highly mechanically strong, highly resistant to heat, shocks, wear, and acids, and are also lightweight.

For improving mechanical characteristics, such as mechanical strength and toughness, of ceramic materials, it has been proposed to disperse silicon carbide (SIC) within particles of silicon nitride ($Si_3N_4$). Since such ceramic materials are highly resistant to heat, mechanically strong, and have good fracture toughness, they are suitable as materials of parts which will be used under high temperature and high loads.

However, since silicon carbide has been dispersed by chemical vapor deposition (CVD), the productivity of the resultant composite ceramic materials is low. The powder of such composite ceramic materials is too fine to handle well. In addition, the composite ceramic powder has poor sinterability if only silicon carbide is dispersed within particles of silicon nitride.

A composite ceramic material has been manufactured as follows: a powder of silicon nitride, a powder of silicon carbide, and a small amount of sintering additive, such as of yttrium oxide ($Y_2O_3$) are mixed so as to be uniformly dispersed, molded to shape, and then sintered. However, different powders cannot be uniformly dispersed beyond the limitation imposed by their particle diameters. For manufacturing a uniform composite ceramic material of silicon nitride and silicon carbide, it has been proposed to produce a composite powder composed of mixed ingredients, molding the composite powder to shape, and sintering the molded body.

According to one proposed process, polysilazane or polysilane is used as a precursor of a composite ceramic material of silicon nitride and silicon carbide, and combined with a compound of titanium, aluminum, hafnium, zirconium, or the like to produce a composite polymer, which is then sintered into a ceramic material.

For example, Japanese laid-open patent publication No. 63-191832 discloses a process of manufacturing polyaluminosilazane by reacting, with heat, polysilazane having a main skeleton composed of units represented by a general formula of $-SiR^1R^2-NR^3-$ where $R^1$, $R^2$, $R^3$ represent a hydrogen atom, an alkyl group, an alkenyl group, or the like, with at least one being a hydrogen atom, and having a number average molecular weight ranging from 100 to 50000, with aluminum alkoxide represented by a general formula of $Al(OR^4)^3$ where $R^4$ represents a hydrogen atom, an alkyl group, or aryl group. The produced polyaluminosilazane is used to synthesize a Si—Al—O—N ceramic (sialon).

Japanese laid-open patent publication No. 3-190932 discloses a process of manufacturing a ceramic by reacting a hafnium compound represented by a general formula of $HfX_4$ where X represents a chlorine atom or a bromine atom with disilazane represented by a general formula of $(SiR^1R^2R^3)_2NH$ where $R^1$, $R^2$, $R^3$ represent a hydrogen atom, a methyl group, or the like and may be the same as or different from each other, thereby generating a hafnium-containing silazane polymer, melting and molding the hafnium-containing silazane polymer to shape, making the molded body infusible, and thereafter sintering the infusible molded body.

Japanese laid-open patent publication No. 3-81330 shows a process of manufacturing a polytitanocarbosilazane by reacting (A) a organic silicon compound represented by a general formula of $X—SiR^1_2—CHR^2—CHR^2—SiR^1_2—X$ where $R^1$ represents hydrogen, chlorine, bromine, a methyl group, an ethyl group, or the like, $R^2$ represents hydrogen or a methyl group, and X represents chlorine or bromine, (B) a halogen silane compound, (C) a titanium compound, and (D) disilazane represented by a general formula of $(R^3_3Si)_2NH$ where $R^3$ represents a hydrogen atom, a methyl group, or the like.

No compound material with yttrium combined with polysilazane has been reported yet.

Japanese laid-open patent publication No. 64-66239 discloses a process using a sintering additive of yttrium. According to the disclosed process, a mixture containing organic halogen silane and a reactive metal compound including a metal such as aluminum, yttrium, or the like is treated at a temperature ranging from 100° to 340° C. to produce halogen-containing metal polysilane. The halogen-containing metal polysilane is reacted with an aminolysis reagent represented by a general formula of either $NHR^{iv}_2$ where $R^{iv}_2$ represents hydrogen, an alkyl group, or a phenyl group or $—SiR^v_3$ where $R^v$ is an alkyl group or the like within a suitable solvent under a waterless condition at a temperature ranging from 25° to 100° C. to collect metal polysilane containing $R^{iv}_2N—$. A ceramic which is formed from metal polysilane containing $R^{iv}_2N—$ is composed mainly of silicon carbide, and is less resistant to heat and shocks and has poorer fracture toughness than a ceramic composed mainly of silicon nitride formed from composite polysilazane.

SUMMARY OF THE INVENTION

It is an object of the present invention to provide an yttrium-containing composite powder which is suitable for manufacturing a composite ceramic sintered body of silicon nitride and silicon carbide that is highly resistant to heat, highly mechanically strong, and has high fracture toughness.

Another object of the present invention is to provide a method of manufacturing such an yttrium-containing composite powder.

Still another object of the present invention is to provide a composite sintered body of silicon nitride which has better sinterability and mechanical characteristics such as mechanical strength, toughness, etc.

Yet still another object of the present invention is to provide a method of manufacturing such a composite sintered body of silicon nitride.

According to an aspect of the present invention, there is provided an yttrium-containing composite powder for use as a material of a silicon nitride/silicon carbide composite sintered body, produced by thermally decomposing yttrium-containing polysilazane having an Si—N bond and an Si—C bond and an Si—O—Y bond and/or an N—O—Y bond in molecules thereof in an inert gas atmosphere or a vacuum at a temperature of at least 800° C., and grinding the thermally decomposed yttrium-containing polysilazane.

The yttrium-containing polysilazane may be synthesized by dissolving polysilazane having a main skeleton composed of repeating units each represented by a general formula of:

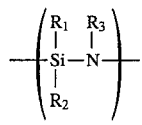

where $R_1$, $R_2$, $R_3$ independently represent a hydrogen atom or a hydrocarbon group, at least one of $R_1$, $R_2$ representing a hydrocarbon group, and yttrium alkoxide represented by a general formula: $Y(OR)_3$ where R represents a hydrogen molecule or a hydrocarbon group, with 3 Rs being either identical to or different from each other, uniformly in an organic solvent, thereby producing a solution, and reacting the solution with heat in an inert gas atmosphere.

According to another aspect of the present invention, there is also provided a method of manufacturing an yttrium-containing composite powder for use as a material of a silicon nitride/silicon carbide composite sintered body, comprising the steps of dissolving polysilazane having a main skeleton composed of repeating units each represented by a general formula of:

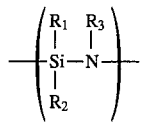

where $R_1$, $R_2$, $R_3$ independently represent a hydrogen atom or a hydrocarbon group, at least one of $R_1$, $R_2$ representing a hydrocarbon group, and yttrium alkoxide represented by a general formula: $Y(OR)_3$ where R represents a hydrogen molecule or a hydrocarbon group, with 3 Rs being either identical to or different from each other, uniformly in an organic solvent, thereby producing a solution, reacting the solution with heat in an inert gas atmosphere, thereby synthesizing yttrium-containing polysilazane, thermally decomposing the yttrium-containing polysilazane in an inert gas atmosphere or a vacuum at a temperature of at least 800° C., and grinding the thermally decomposed yttrium-containing polysilazane into an yttrium-containing composite powder.

According to still another aspect of the present invention, there is provided an yttrium-containing composite powder for use as a material of a silicon nitride/silicon carbide composite sintered body, produced by thermally decomposing yttrium-containing polysilazane having an Si—N bond and an Si—C bond and an Si—Y bond and/or an N—O bond in molecules thereof in an inert gas atmosphere or a vacuum at a temperature of at least 800° C., and grinding the thermally decomposed yttrium-containing polysilazane.

The yttrium-containing polysilazane may be synthesized by reacting, with ammonia, a solution which is produced by uniformly dissolving, in a substantially anhydrous solvent, either a chlorosilane compound represented by a general formula of $R_nSiCl_{4-n}$ where R represents a hydrogen atom or a hydrocarbon group, at least one of R representing a hydrocarbon group, and n is 1, 2, or 3, or a chlorosilane mixture composed of at least two chlorosilane compounds, and an yttrium halide $YX_3$ where X represents a chlorine atom or a bromine atom.

According to yet still another aspect of the present invention, there is provided a method of manufacturing an yttrium-containing composite powder for use as a material of a silicon nitride/silicon carbide composite sintered body, comprising the steps of dissolving a chlorosilane compound represented by a general formula of $RSiCl_3$ where R represents a hydrocarbon group and an yttrium halide $YX_3$ where X represents a chlorine atom or a bromine atom, uniformly in a substantially anhydrous solvent, thereby producing a solution, reacting the solution with ammonia, thereby generating yttrium-containing polysilazane, thermally decomposing the yttrium-containing polysilazane in an inert gas atmosphere or a vacuum at a temperature of at least 800° C., and grinding the thermally decomposed yttrium-containing polysilazane into an yttrium-containing composite powder.

According to a further aspect of the present invention, there is provided a method of manufacturing an yttrium-containing composite powder for use as a material of a silicon nitride/silicon carbide composite sintered body, comprising the steps of dissolving either a chlorosilane compound represented by a general formula of $R_2SiCl_2$ where R represents a hydrocarbon group with at least one of Rs representing a hydrocarbon group or a chlorosilane mixture of a chlorosilane compound represented by $R_2SiCl_2$ and a chlorosilane compound represented by $RSiCl_3$ where R represents a hydrocarbon group, and an yttrium halide $YX_3$ where X represents a chlorine atom or a bromine atom, uniformly in a substantially anhydrous solvent, thereby producing a solution, reacting the solution with ammonia to generate yttrium-containing silazane, polymerizing the yttrium-containing silazane with heat in an inert gas atmosphere, thereby producing yttrium-containing polysilazane, thermally decomposing the yttrium-containing polysilazane in an inert gas atmosphere or a vacuum at a temperature of at least 800° C., and grinding the thermally decomposed yttrium-containing polysilazane into an yttrium-containing composite powder.

According to a still further aspect of the present invention, there is provided a silicon nitride composite sintered body comprising particles of silicon nitride and fine particles of silicon carbon monoxide and fine particles of silicon carbide, the fine particles of silicon carbon monoxide and fine particles of silicon carbide being contained in the particles of silicon nitride.

The silicon nitride composite sintered body may further comprise a component of SiNYO and/or SiYO, the fine particles of silicon carbon monoxide and fine particles of silicon carbide being contained in grain boundaries of the particles of silicon nitride.

According to a yet still further aspect of the present invention, there is provided a method of manufacturing a silicon nitride composite sintered body, comprising the steps of producing a powder of SiNC and/or a powder of SiNCO from polysilazane having an Si—C bond and a number average molecular weight of at least 400, and sintering the powder of SiNC and/or the powder of SiNCO.

The polysilazane may be produced by effecting ammonolysis on at least one material selected from the group consisting of cyclosilazane, a product of halosilane, halosilane, and a mixture of halosilanes, thereby generating a silazane oligomer, maintaining the silazane oligomer at a first temperature ranging from 100° to 300° C. while stirring the silazane oligomer under a reduced pressure, then heating and maintaining the silazane oligomer at a second temperature of at most 400° C. which is higher than the first temperature, thereby removing low-molecular-weight components from the silazane oligomer and polymerizing the silazane oligomer with each.

The above and other objects, features, and advantages of the present invention will become apparent from the fol-

DETAILED DESCRIPTION OF THE PREFERRED EMBODIMENTS

Figure 1:
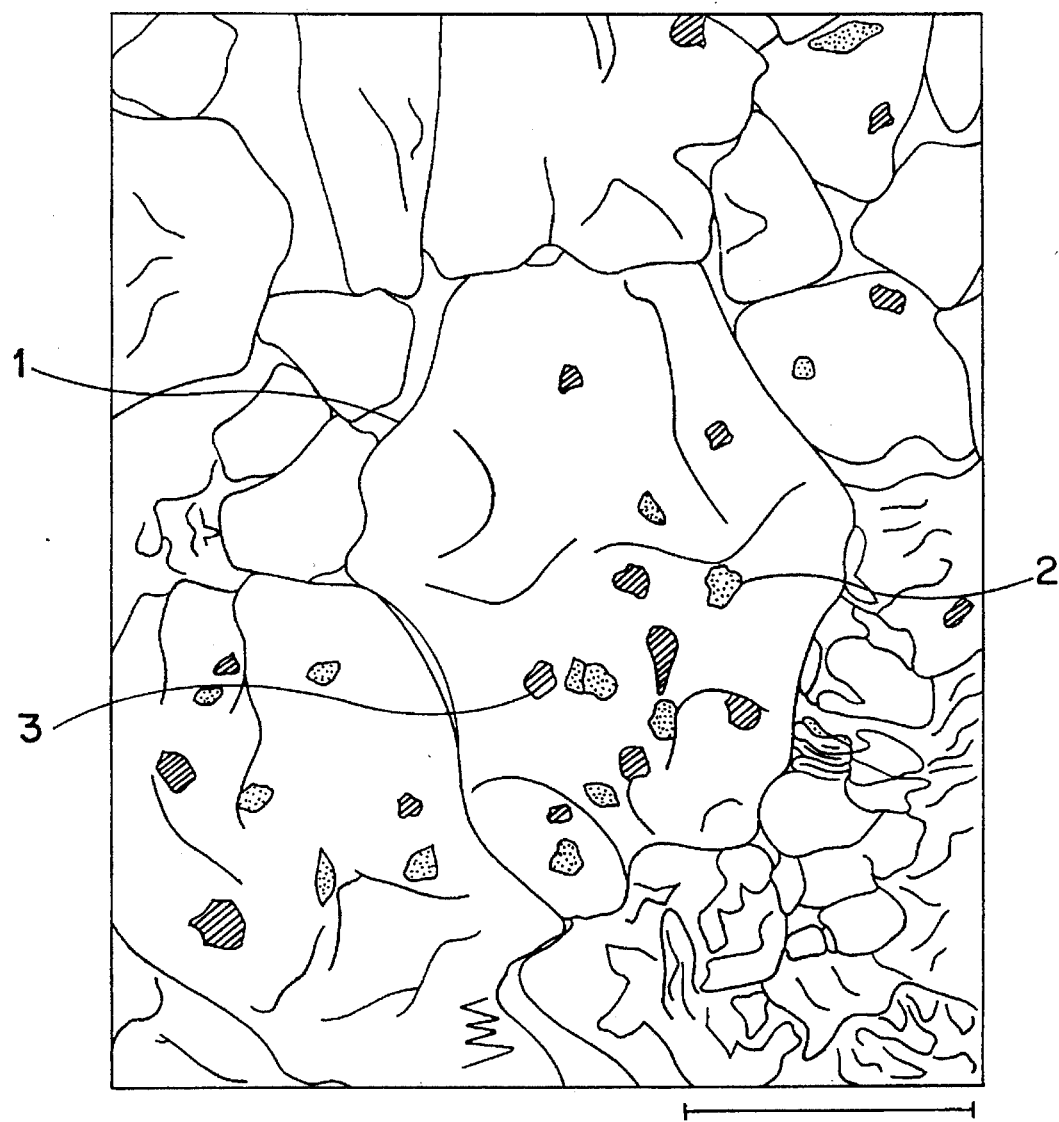
FIG. 1 is a diagram showing a representation of the structure of a composite sintered body of silicon nitride according to the present invention.

[I] A first embodiment of the present invention will be described below:

{1} Starting material:

(1) Polysilazane:

The skeleton of polysilazane which is used in the present invention can be represented by the following general formula:

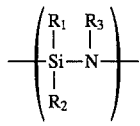

where $R_1$, $R_2$, $R_3$ independently represent a hydrogen atom or a hydrocarbon group, at least one of $R_1$, $R_2$ representing a hydrocarbon group. In view of reactivity with yttrium alkoxide, the number of carbon atoms of the hydrocarbon group should preferably range from 1 to 5. If the number of carbon atoms of the hydrocarbon group exceeded 5, the reactivity between yttrium alkoxide and silicon atoms or nitrogen atoms would be lowered due to a steric hindrance.

Polysilazane alone or a copolymer of polysilazane and another polymer may be used. The polysilazane used in the present invention may have a chain, ring, or crosslinked structure, or may have a plurality of such structures in molecules. Polysilazane of one type or a mixture of different types may be used.

The polysilazane used in the present invention should preferably have a number average molecular weight ranging from 100 to 10000. Polysilazane manufactured according to a known process is used in the present invention. However, polysilazane manufactured from cyclosilazane and halosilane should preferably be used.

Cyclosilazane is represented by a general formula of $(R_2SiNR)_n$ where R represents H or an alkyl group, and n is an integer ranging from 2 to 4. Various kinds of cyclosilazane indicated by $(Me_2SiNH)_2$, $(MeHSiNH)_2$, $(H_2SiNH)_2$, $(Me_2SiNH)_3$, $(MeHSiNH)_3$, $(H_2SiNH)_3$, $(Me_2SiNH)_4$, $(MeHSiNH)_4$, $(H_2SiNH)_4$, etc. are preferable. Of these, hexamethylcyclotrisilazane $(Me_2SiNH)_3$ is particularly preferable.

Chlorosilane represented by a general formula of $R_nSiCl_{4-n}$ where n is an integer ranging from 0 to 3, and R represents H or an alkyl group is preferable for use as halosilane. Particularly, trichloromethylsilane is preferable.

{2} Production of polysilazane:

One example of a method of producing polysilazane using cyclosilazane and halosilane will be described below. However, the present invention is not limited to this example. In the example, hexamethylcyclotrisilazane and trichloromethylsilane are used as cyclosilazane and halosilane, respectively.

First, hexamethylcyclotrisilazane and trichloromethylsilane are mixed with each other preferably at a molar ratio of 1:1~1:5, or more preferably at a molar ratio of 1:2~1:4.

Then, the mixture of hexamethylcyclotrisilazane and trichloromethylsilane is perfused with heat at a temperature ranging from about 190° to 200° C., whereupon the hexamethylcyclotrisilazane is split open generating a chlorosilazane oligomer. At this time, the molecular weight distribution of the produced chlorosilazane oligomer can be adjusted by adjusting the period of time for which the perfusing process is carried out. The period of time of the perfusing process depends on the types and amounts of the starting materials, but may range from about 3 to 24 hours.

Thereafter, an ammonia gas is blown into a solution of chlorosilazane oligomer at a rate of 10~90 liters/hour, preferably 30~60 liters/hour to effect ammonolysis for generating an aminosilazane oligomer. Ammonium chloride formed as a by-product in the ammonolysis is removed.

The produced aminosilazane oligomer is deammoniated in an inert gas such as a nitrogen gas or the like or under a reduced pressure while being heated to a temperature ranging from about 250° to 400° C., producing thermoplastic colorless polysilazane in a solid phase. The aminosilazane oligomer may be heated for a period of time ranging from 30 to 60 minutes. If the deammoniating process is carried out under a reduced pressure with the aminosilazane oligomer being stirred and the aminosilazane oligomer is heated in two steps, then low-molecular-weight components which do not contribute to the condensation reaction of polysilazane can be removed, resulting in a higher molecular weight of polysilazane and reducing variations of the molecular weight of generated polysilazane. Therefore, it is preferable to conduct the deammoniating process under a reduced pressure with the aminosilazane oligomer being stirred and heated in two stages.

In each of the two stages in which the aminosilazane oligomer is heated during the deammoniating process, the pressure in a reaction chamber is maintained in the range of from 0.1 to 200 mmHg, preferably from 70 to 100 mmHg, and the aminosilazane oligomer is stirred at a speed (represented by the speed at which the reactants flow) ranging from 0.1 to 1000 m/min., preferably from 100 to 300 m/min.

If the pressure in the reaction chamber were higher than 200 mmHg, then low-molecular-weight components would not be removed sufficiently. If the pressure in the reaction chamber were lower than 0.1 mmHg, then no corresponding results would be achieved. If the stirring speed were lower than 0.1 m/min., then the rate of removal of low-molecular-weight components would be too low. It would be difficult to increase the stirring speed in excess of 1000 m/min.

In the first stage, the aminosilazane oligomer is heated to a temperature ranging from 100° to 300° C., preferably from 200° to 250° C. If the temperature were lower than 100° C., then low-molecular-weight components would not be removed sufficiently. If the temperature exceeded 300° C., then the aminosilazane oligomer would be subjected to a heated polymerization reaction (condensation reaction), resulting in a loss of the effects which would be produced by the second-stage heating. The aminosilazane oligomer may be heated by placing the reaction chamber in a salt bath or the like. The period of time during which the aminosilazane oligomer is heated in the first stage may be adjusted depending on the usage of polysilazane, but should preferably be in the range of from 0.1 to 20 hours, and more preferably be in the range of from 0.2 to 10 hours.

The first-stage heating removes many of low-molecular-weight components which do not contribute to a condensation reaction of polysilazane, and hence makes highly uniform the distribution of the molecular weight (converted from a value measured by gel permeation chromatography (GPC) into polystyrene) of the aminosilazane oligomer. The molecular weight of the removed low-molecular-weight components is 700 or lower, preferably 400 or lower. The amount of low-molecular-weight components remaining in the aminosilazane oligomer is 20 weight % or less. Though the aminosilazane oligomer is somewhat condensed in the first-stage heating, its number average molecular weight is about 1000 or less.

After the first-stage heating, the temperature is increased, and the aminosilazane oligomer is heated under the reduced pressure in the second stage while it is being stirred. In the second stage, the aminosilazane oligomer is heated to a temperature ranging from 200° to 400° C., preferably from 250° to 350° C., higher than the temperature in the first-stage heating, and polymerized for a period of time ranging from 1 to 10 hours. In the second-stage heating, the aminosilazane oligomer is sufficiently condensed into polysilazane.

The polysilazane thus produced has an Si—N bond and an Si—C bond, and is suitable for use as a material of a composite sintered body of silicon nitride and silicon carbide.

{3} Synthesis of yttrium-containing polysilazane:

The produced polysilazane and yttrium alkoxide are dissolved into an organic solvent to synthesize yttrium-containing polysilazane. Yttrium alkoxide used in the present invention is represented by a general formula of $Y(OR)_3$ where R indicates hydrogen or a hydrocarbon group. The hydrocarbon group should preferably be an alkyl group with the number of carbon atoms being in the range of from 1 to 20, and more preferably be an alkyl group with the number of carbon atoms being in the range of from 1 to 10. Particularly preferable is an alkyl group with the number of carbon atoms being in the range of from 1 to 4. Such yttrium alkoxide may be trimethoxy yttrium ($Y(OCH_3)_3$), triethoxy yttrium ($Y(OC_2H_5)_3$), triisopropoxy yttrium ($Y(O\text{-}i\text{-}C_3H_7)_3$), or the like.

The organic solvent in which the polysilazane and the yttrium alkoxide are dissolved may be a hydrocarbon solvent such as of aromatic hydrocarbon, fatty hydrocarbon, or alicyclic hydrocarbon, or halogenated hydrocarbon, fatty ether, or alicyclic ether. Preferably, the solvent should be benzene, toluene, xylene, dichloromethane, chloroform, ethyl ether, or the like. The organic solvent should preferably contain 0.1 weight % of water.

The polysilazane and the yttrium alkoxide are mixed with each other at such a ratio that the atomic weight ratio of yttrium (Y) and silicon (Si) ranges from 0.003 to 0.1, preferably from 0.008 to 0.05, more preferably from 0.01 to 0.04. If a greater amount of yttrium alkoxide were added, then the heat resistance of a produced ceramic would be reduced. If a smaller amount of yttrium alkoxide were added, then the sinterability of a ceramic would be lowered.

The polysilazane and the yttrium alkoxide are reacted at a temperature which is generally in the range of from 50° to 400° C., though the temperature varies depending on the types of polysilazane and yttrium alkoxide that are used. If the reaction temperature exceeded 400° C. then yttrium-containing polysilazane would be thermally decomposed into a gel state. It is necessary for the polysilazane and the yttrium alkoxide to react in an inert gas atmosphere such as of nitrogen, argon, or the like. An oxidizing atmosphere such as of air is not preferable because it would oxidize or hydrolyze the polysilazane and the yttrium alkoxide. Preferably, the polysilazane and the yttrium alkoxide should be reacted with each other for a period of time ranging from 2 to 24 hours. If the reaction period were less than 2 hours, then the polysilazane and the yttrium alkoxide would not react sufficiently with each other. If the reaction period were longer than 24 hours, then the yield would remain substantially unchanged. After the reaction, the produced yttrium-containing polysilazane is removed from unreactants and by-products by a known process such as filtering.

In above synthetic reaction, the yttrium alkoxide reacts with Si—R, N—R groups of the polysilazane, producing an Si—O—Y bond and/or an N—O—Y bond. The generated yttrium-containing polysilazane has a number average molecular weight ranging from 300 to 10000, and the degree of polymerization of the polymer is increased by the crosslinking action of the yttrium alkoxide.

{4} Synthesis of yttrium-containing composite powder:

The synthesized yttrium-containing polysilazane is thermally treated at a temperature of 800° C. or higher, preferably in the range of from 1000° to 1200° C., preferably for a period of time ranging from 1 to 4 hours. If the synthesized yttrium-containing polysilazane were thermally treated at a temperature lower than 800° C., then the thermal decomposition of the yttrium-containing polysilazane would not sufficiently be progressed. The yttrium-containing polysilazane should preferably be thermally treated in a nitrogen gas, but may be thermally treated in an inert gas of argon or the like or in a vacuum.

The thermally treated product is ground by a grinding machine into a composite powder of silicon nitride and silicon carbide in which yttrium (which may be regarded as oxide yttrium ($Y_2O_3$)) is uniformly dispersed. The content of yttrium (as converted into oxide yttrium) in the composite powder should preferably be in the range of from 2 to 10 weight % of the entire weight of the composite powder. The content of SiC in the composite powder should preferably be in the range of from 5 to 40 weight % of the entire weight of the composite powder though it varies depending on the reacting conditions. The yttrium-containing composite power has a particle diameter which should preferably range from 0.05 to 1 μm.

Since the yttrium-containing composite power produced by thermally processing the yttrium-containing polysilazane has uniformly dispersed yttrium, a ceramic body molded from the composite power has excellent sinterability. The sintered ceramic body contains fine particles of silicon carbide in either particles of silicon nitride or grain boundaries, resulting in a fine structure or forming subgrain boundaries for increased ceramic strength.

[Inventive example 1]

{1} Synthesis of polysilazane:

54.8 g of hexamethylcyclotrisilazane and 111 g of trichloromethylsilane (the molar ratio of hexamethylcyclotrisilazane and trichloromethylsilane was 1:3) were placed in a 500-ml eggplant type flask having a cooling tower and a condenser and sufficiently replaced with a nitrogen gas, heated by a heating mantle to a temperature ranging from 190° to 195° C., and perfused with the heat for 12 hours. After being cooled to room temperature, ammonium chloride produced as a by-product was filtered out, and 136 g of chlorosilazane oligomer was obtained.

100 g of the produced chlorosilazane oligomer was placed in a 2-liter three-neck flask having a stirrer and sufficiently replaced with nitrogen, and about 1 liter of cyclohexane was added as a solvent. The mixture was cooled with ice and stirred during which time an ammonia gas was blown into the mixture at a rate of about 60 liters/hour for 3 hour to carry out ammonolysis. Thereafter, ammonium chloride produced as a by-product was filtered out under suction, and the solvent was removed, producing a colorless viscous liquid, i.e., an aminosilazane oligomer.

50 g of the produced aminosilazane oligomer was placed in a reaction chamber, and thermally treated in a flow of nitrogen at a temperature of 350° C. for 30 minutes, thereby producing 32 g of thermoplastic solid polysilazane. The number average molecular weight of the produced polysilazane was 1500 as determined by gel permeation chromatography (GPC).

{2} Synthesis of yttrium-containing polysilazane:

43 g of polysilazane and 6.4 g of trimethoxy yttrium $(Y(OCH_3)_3)$ were dissolved into 300 ml of benzene which contains 0.06 weight % of water, and the solution was placed in a 1-liter eggplant type flask having a cooling tower and sufficiently replaced with a nitrogen gas. The solution was heated to and kept at a temperature of 80° C. for 6 hours for a synthetic reaction to take place. After being cooled to room temperature, the solvent was removed, and 41 g of solid yttrium-containing polysilazane was obtained.

{3} Production of yttrium-containing composite powder:

20 g of the produced yttrium-containing polysilazane was thermally treated in a nitrogen gas atmosphere at 1200° C. for 30 minutes, producing 12.7 g of black solid mass. The obtained black solid mass was grounded by a grinding machine into an yttrium-containing composite powder. The produced yttrium-containing composite powder was analyzed for ingredient elements. The results of the analysis are given in Table 1 below.

TABLE 1

| Ingredient elements of the produced yttrium-containing composite powder | | | | | |
|---|---|---|---|---|---|
| | Si | N | C | Y | O |
| Content (%) | 51.8 | 22.7 | 14.6 | 6.1 | 3.4 |

[II] A second embodiment of the present invention will be described below:

{1} Starting material:

(1) Chlorosilane compound and chlorosilane mixture:

A chlorosilane compound represented by a general formula of $R_nSiCl_{4-n}$ or a chlorosilane mixture composed of two or more chlorosilane compounds is used. In the above general formula, n is 1, 2, or 3 and $R_1$, $R_2$, $R_3$ independently represent a hydrogen atom or a hydrocarbon group, at least one of them representing a hydrocarbon group. In view of reactivity with an yttrium halide, the number of carbon atoms of the hydrocarbon group should preferably range from 1 to 5. If the number of carbon atoms of the hydrocarbon group exceeded 5, the reactivity between yttrium atoms and silicon atoms or nitrogen atoms would be lowered due to a steric hindrance. Preferable hydrocarbon groups include a methyl group, an ethyl group, or the like. It is preferable to use trichloromethylsilane singly as the chlorosilane compound as it requires no polymerization process and can be handled with ease. It is preferable to use a mixture of a trichlorosilane compound and a dichlorosilane compound as the chlorosilane mixture, and particularly preferable to use a mixture of trichloromethylsilane and dichloromethylsilane as the chlorosilane mixture.

(2) Yttrium halide:

An yttrium halide used in the second embodiment is represented by a general formula of $YX_3$ where X indicates a halogen element, preferably a chlorine or bromine atom, more preferably yttrium chloride.

(3) Organic solvent:

An organic solvent capable of dissolving both a chlorosilane compound and an yttrium halide is used in the second embodiment. A preferable organic solvent is pyridine. It is necessary that the organic solvent contain substantially no water. If the organic solvent had a water content, then it would decompose the chlorosilane compound.

{2} Production of yttrium-containing polysilazane:

A process of manufacturing yttrium-containing polysilazane using trichloromethylsilane and yttrium chloride respectively as the chlorosilane compound and the yttrium halide will be described below.

First, trichloromethylsilane and yttrium chloride are dissolved into an organic solvent. At this time, it is preferable to dissolve yttrium chloride into an organic solvent and then gradually add trichloromethylsilane to the solution while stirring same to dissolve the added material. The amount of organic solvent used is 3 to 6 times the combined weight of trichloromethylsilane and yttrium chloride.

The trichloromethylsilane and the yttrium chloride are mixed with each other at such a ratio that the atomic weight ratio of yttrium (Y) and silicon (Si) ranges from 0.003 to 0.1, preferably from 0.008 to 0.05, more preferably from 0.01 to 0.04. If a greater amount of yttrium halide were added, then the heat resistance of the produced ceramic would be reduced. If a smaller amount of yttrium halide were added, then the sinterability of a ceramic would be lowered.

Thereafter, an ammonia gas is blown into the mixed solution of trichloromethylsilane and yttrium chloride at a rate of 10~90 liters/hour, preferably 30~60 liters/hour to effect ammonolysis for 3~4 hours for generating an yttrium-containing silazane oligomer. Crystals of ammonium chloride formed as a by-product in the ammonolysis are removed by suction filtering.

Then, while heating the reaction product, the solvent is removed by vacuum suction, thus producing solid yttrium-containing polysilazane.

If a compound other than trichloromethylsilane, particularly a dichlorosilane compound, or a mixture of dichlorosilane and trichlorosilane compounds is used, no solid yttrium-containing polysilazane, but a liquid yttrium-containing silazane oligomer having a low degree of polymerization, is produced according to the above process. For better handling, the liquid yttrium-containing silazane oligomer should preferably be polymerized further into a solid.

To more polymerize the liquid yttrium-containing silazane oligomer, it is deammoniated in an inert gas such as a nitrogen gas or the like or under a reduced pressure while being heated to a temperature ranging from about 250° to 400° C. The yttrium-containing silazane oligomer may be heated for a period of time ranging from 30 to 60 minutes. If the deammoniating process is carried out under a reduced pressure with the yttrium-containing silazane oligomer being stirred and the yttrium-containing silazane oligomer is heated in two steps, then low-molecular-weight components which do not contribute to a condensation reaction of polysilazane can be removed, resulting in a higher molecular weight of polysilazane and reducing variations of the molecular weight of generated polysilazane. Therefore, it is preferable to conduct the deammoniating process under a reduced pressure with the yttrium-containing silazane oligomer being stirred and heated in two stages.

In each of the two stages in which the yttrium-containing silazane oligomer is heated during the deammoniating process, the pressure in a reaction chamber is maintained in the range of from 0.1 to 200 mmHg, preferably from 70 to 100 mmHg, and the yttrium-containing silazane oligomer is stirred at a speed (represented by the speed at which the reactants flow) ranging from 0.1 to 1000 m/min., preferably from 100 to 300 m/min.

If the pressure in the reaction chamber were higher than 200 mmHg, then low-molecular-weight components would not be removed sufficiently. If the pressure in the reaction chamber were lower than 0.1 mmHg, then no corresponding results would be achieved. If the stirring speed were lower than 0.1 m/min., then the rate of removal of low-molecular-weight components would be too low. It would be difficult to increase the stirring speed in excess of 1000 m/min.

In the first stage, the yttrium-containing silazane oligomer is heated to a temperature ranging from 100° to 300° C., preferably from 200° to 250° C. If the temperature were lower than 100° C., then low-molecular-weight components would not be removed sufficiently. If the temperature exceeded 300° C., then the yttrium-containing silazane oligomer would be subjected to a heated polymerization reaction (condensation reaction), resulting in a loss of the effects which would be produced by the second-stage heating. The yttrium-containing silazane oligomer may be heated by placing the reaction chamber in a salt bath or the like. The period of time during which the yttrium-containing silazane oligomer is heated in the first stage may be adjusted depending on the usage of polysilazane, but should preferably be in the range of from 0.1 to 5 hours, and more preferably be in the range of from 0.2 to 1 hours.

The first-stage heating removes many of low-molecular-weight components which do not contribute to a condensation reaction of polysilazane, and hence highly uniformizes the distribution of the molecular weight (converted from a value measured by gel permeation chromatography (GPC) into polystyrene) of the yttrium-containing silazane oligomer. The molecular weight of the removed low-molecular-weight components is preferably 700 or lower. The amount of low-molecular-weight components remaining in the yttrium-containing silazane oligomer is 20 weight % or less. Though the yttrium-containing silazane oligomer is somewhat condensed in the first-stage heating, its number average molecular weight is about 1000 or less.

After the first-stage heating, the temperature is increased, and the yttrium-containing silazane oligomer is heated under the reduced pressure in the second stage while it is being stirred. In the second stage, the yttrium-containing silazane oligomer is heated to a temperature ranging from 200° to 400° C., preferably from 250° to 350° C., higher than the temperature in the first-stage heating, and polymerized for a period of time ranging from 1 to 10 hours. In the second-stage heating, the yttrium-containing silazane oligomer is sufficiently condensed into yttrium-containing polysilazane.

The yttrium-containing polysilazane thus produced has an Si—N bond and an Si—C bond, and the yttrium halide has an Si—Y bond and/or an N—Y bond produced in reaction with an Si—H and/or an N—H group. The number average molecular weight of the produced yttrium-containing polysilazane ranges from about 500 to 50000.

{3} Synthesis of yttrium-containing composite powder:

The synthesized yttrium-containing polysilazane is thermally treated at a temperature of 800° C. or higher up to 1700° C., preferably in the range of from 1000° to 1500° C., preferably for a period of time ranging from 0.5 to 4 hours. If the synthesized yttrium-containing polysilazane were thermally treated at a temperature lower than 800° C., then the thermal decomposition of the yttrium-containing polysilazane would not sufficiently be progressed. If the synthesized yttrium-containing polysilazane were thermally treated at a temperature higher than 1700° C., then the β-type crystallization and decomposition of silicon nitride would be accelerated. The yttrium-containing polysilazane should preferably be thermally treated in a nitrogen gas, but may be thermally treated in an inert gas of argon or the like or in a vacuum.

The thermally treated product is ground by a grinding machine into a composite powder of silicon nitride and silicon carbide in which yttrium (which may be regarded as oxide yttrium ($Y_2O_3$)) is uniformly dispersed. The content of yttrium (as converted into oxide yttrium) in the composite powder should preferably be in the range of from 2 to 10 weight % of the entire weight of the composite powder. The content of SiC in the composite powder should preferably be in the range of from 5 to 40 weight % of the entire weight of the composite powder though it varies depending on the reacting conditions. The yttrium-containing composite power has a particle diameter which should preferably range from 0.05 to 1 μm.

Since the yttrium-containing composite power produced by thermally processing the yttrium-containing polysilazane has uniformly dispersed yttrium, a ceramic body molded from the composite power has excellent sinterability. The sintered ceramic body contains fine particles of silicon carbide in either particles of silicon nitride or grain boundaries, resulting in a fine structure or forming subgrain boundaries for increased ceramic strength.

[Inventive example 2]

500 ml of anhydrous pyridine and 6.8 g of yttrium chloride were placed in a 1-liter medium bottom replaced with a nitrogen gas, and stirred into a uniform solution for 24 hours. The solution was then put in a 1000-ml four-neck flask having a mechanical stirrer, a blowing pipe, and a dropping funnel. While introducing a nitrogen gas and stirring the solution, 139 g of trichloromethylsilane was dropped from the dropping funnel, producing a uniform solution.

The solution was then cooled with ice and stirred during which time an ammonia gas was blown into the solution at a rate of about 60 liters/hour for 3 hour to carry out ammonolysis. Thereafter, ammonium chloride produced as a by-product was filtered out under suction, and the solvent was removed by vacuum suction, producing 60 g of transparent solid yttrium-containing polysilazane.

50 g of the produced yttrium-containing polysilazane was thermally treated in a nitrogen gas atmosphere at a temperature of 1200° C. for 30 minutes, thereby producing 31.6 g of black solid mass. The obtained black solid mass was ground by a grinding machine into an yttrium-containing composite powder having an average particle diameter of 0.8 μm. The produced yttrium-containing composite powder was analyzed for ingredient elements. The results of the analysis are given in Table 2 below. The produced yttrium-containing composite powder was in an amorphous state as determined by X-ray diffraction analysis.

TABLE 2

| | Ingredient elements of the produced yttrium-containing composite powder | | | | |
|---|---|---|---|---|---|
| | Si | N | C | Y | O |
| Content (%) | 52.7 | 25.6 | 12.8 | 6.7 | 1.0 |

[Inventive example 3]

500 ml of anhydrous pyridine and 6.8 g of yttrium chloride were placed in a 1-liter medium bottom replaced with a nitrogen gas, and stirred into a uniform solution for 24 hours. The solution was then put in a 1000-ml four-neck flask having a mechanical stirrer, a blowing pipe, and a dropping funnel. While introducing nitrogen gas and stirring the solution, 104 g of trichloromethylsilane and 30 g of dichlorodimethylsilane were dropped from the dropping funnel, producing a uniform solution.

The solution was then cooled with ice and stirred during which time an ammonia gas was blown into the solution at a rate of about 60 liters/hour for 3 hours to carry out ammonolysis. Thereafter, ammonium chloride produced as a by-product was filtered out under suction, and the solvent was removed by vacuum suction, producing 98 g of white viscous liquid (yttrium silazane oligomer).

98 of the produced yttrium silazane oligomer was placed in a reaction chamber, and thermally treated in a flow of nitrogen at a temperature of 300° C. for 30 minutes, thereby producing 49 g of transparent solid material (yttrium-containing polysilazane). The number average molecular weight of the produced yttrium-containing polysilazane was 1500 as determined by gel permeation chromatography (GPC).

30 g of the produced yttrium-containing polysilazane was thermally treated in a nitrogen gas atmosphere at a temperature of 1200° C. for 30 minutes, thereby producing 14.4 g of black solid mass. The obtained black solid mass was grounded by a grinding machine into an yttrium-containing composite powder having an average particle diameter of 0.8 μm. The produced yttrium-containing composite powder was analyzed for ingredient elements. The results of the analysis are given in Table 3 below. The produced yttrium-containing composite powder was in an amorphous state as determined by X-ray diffraction analysis.

TABLE 3

| Ingredient elements of the produced yttrium-containing composite powder | | | | |
|---|---|---|---|---|
| Si | N | C | Y | O |
| Content (%) 53.1 | 24.2 | 14.8 | 6.2 | 1.2 |

[III] A third embodiment of the present invention will be described below:

{1} Structure of a silicon nitride composite sintered body:

A silicon nitride composite sintered body according to a third embodiment of the present invention contains fine particles of silicon carbon monoxide (SiCO) and fine particles of SiC in particles of $Si_3N_4$. Each of the particles of $Si_3N_4$ normally contains one or more fine particles of SiCO, but some particles of $Si_3N_4$ contain fine particles of SiC and some particles of $Si_3N_4$ do not contain fine particles of SiC. When the fine particles of SiCO and the fine particles of SiC contained in the particles of $Si_3N_4$ are grown into greater diameters upon sintering, they tend to enter the grain boundaries of the particles of $Si_3N_4$. Therefore, the silicon nitride composite sintered body according to the third embodiment has such fine particles of SiCO and/or SiC in the grain boundaries of the particles of $Si_3N_4$.

FIG. 1 shows an example of the structure of a silicon nitride composite sintered body according to the third embodiment.

In the sintered body shown in FIG. 1, fine particles 2 of SiCO and fine particles 3 of SiC are dispersed substantially uniformly in particles 1 of $Si_3N_4$. In the silicon nitride composite sintered body of the illustrated structure, subgrain boundaries are generated along the particles 2, 3 of SiCO, SiC dispersed in the particles 1 of $Si_3N_4$, and cracks are apt to be propagated along the subgrain boundaries. This is because the subgrain boundaries are equivalent to quasi fine structures in the particles 1 of $Si_3N_4$, thereby increasing the mechanical strength thereof. If the subgrain boundaries are of complex shape, then the distance which cracks are propagated is very long, thereby increasing the fracture toughness.

While the silicon nitride composite sintered body shown in FIG. 1 contains the particles 2, 3 of SiCO, SiC in the particles 1 of $Si_3N_4$, it may contain only particles 2 of SiCO in the particles 1 of $Si_3N_4$.

Figure 2:
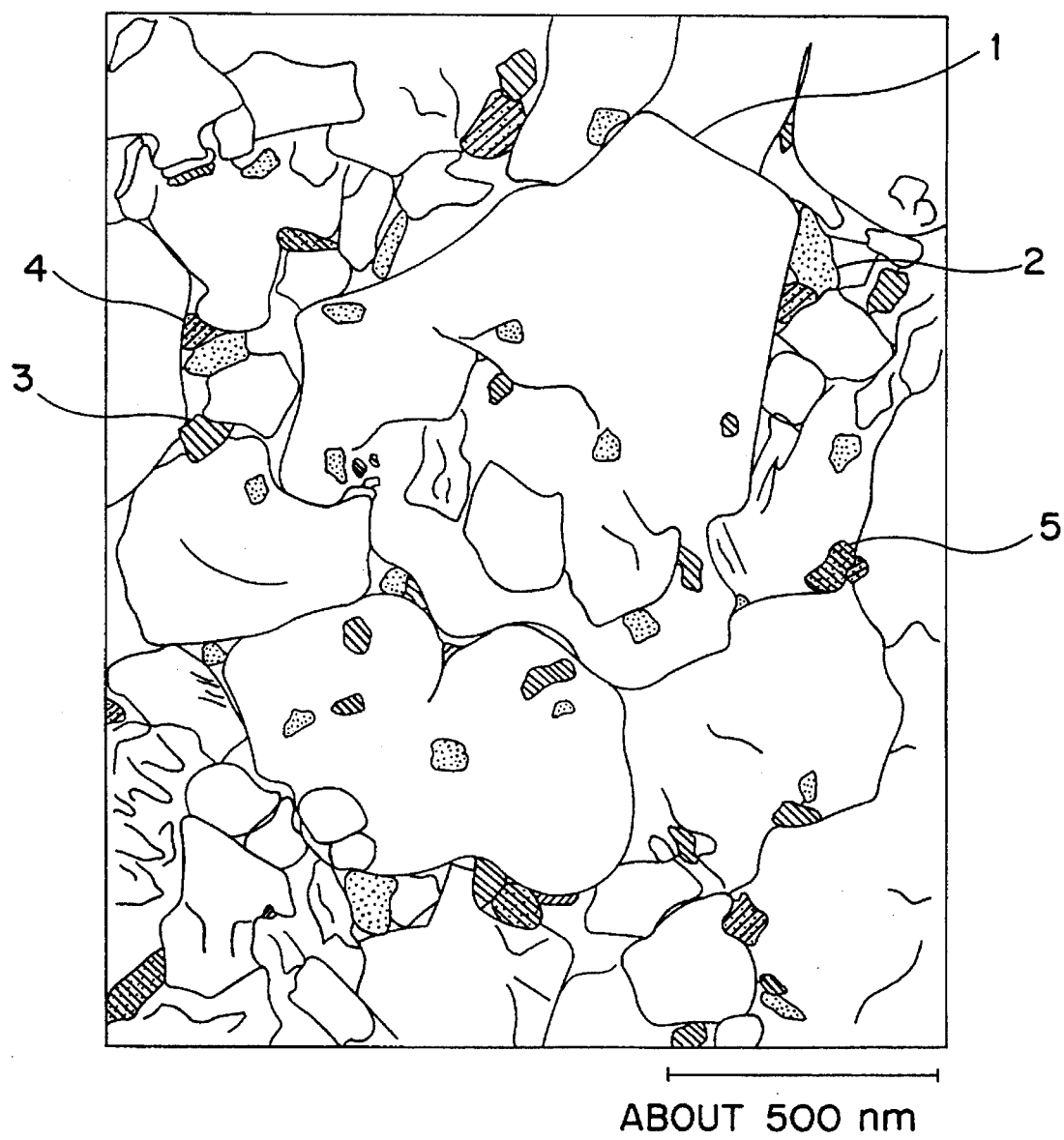
FIG. 2 is a diagram showing a representation of the structure of another composite sintered body of silicon nitride according to the present invention.

FIG. 2 shows another example of the structure of a silicon nitride composite sintered body according to the third embodiment.

In the sintered body shown in FIG. 2, fine particles 2 of SiCO and fine particles 3 of SiC are dispersed not only in particles 1 of $Si_3N_4$ but also in grain boundaries of $Si_3N_4$, and a SiYO grain boundary phase 4 and a SiNYO grain boundary phase 5 are also dispersed therein which are produced from an yttrium-containing additive used in a sintering process.

The silicon nitride composite sintered body of the structure shown in FIG. 2 also has high fracture toughness as cracks are propagated along the fine particles 2 of SiCO and the fine particles 3 of SiC.

{2} Process of manufacturing the silicon nitride composite sintered body:

The silicon nitride composite sintered body according to the third embodiment can be produced by sintering a powder of SiNC and/or SiNCO that is generated from a certain polysilazane.

(1) Production of polysilazane:

Polysilazane used in this process has an Si—C bond. Polysilazanes without such an Si—C bond would not allow fine particles of SiCO, SiC to be dispersed in particles of $Si_3N_4$. The polysilazane has a molecular weight of 400 or greater, preferably in the range of from 1000 to 2000. If the molecular weight were lower than 400, then almost all components would be evaporated upon thermal treatment because no crosslinking would be in progress, resulting in a low yield.

Cyclosilazane and halosilane are used as materials of polysilazane. Cyclosilazane is represented by a general formula of $(R_2SiNR)_n$ where R represents H or an alkyl group, and n is an integer ranging from 2 to 4. Various kinds of cyclosilazane indicated by $(Me_2SiNH)_2$, $(MeHSiNH)_2$, $(H_2SiNH)_2$, $(Me_2SiNH)_3$, $(MeHSiNH)_3$, $(H_2SiNH)_3$, $(Me_2SiNH)_4$, $(MeHSiNH)_4$, $(H_2SiNH)_4$, etc. are preferable. Of these, hexamethylcyclotrisilazane $(Me_2SiNH)_3$ is particularly preferable.

Chlorosilane represented by a general formula of $R_nSiCl_{4-n}$ where n is an integer ranging from 0 to 3, and R represents H or an alkyl group is preferable for use as halosilane. Particularly, trichloromethylsilane is preferable. A mixture of trichloromethylsilane and dichloromethylsilane is also preferable.

One example of a method of producing polysilazane using hexamethylcyclotrisilazane and trichloromethylsilane as cyclosilazane and halosilane, respectively.

First, hexamethylcyclotrisilazane and trichloromethylsilane are mixed with each other preferably at a molar ratio of 1:1~1:5, or more preferably at a molar ratio of about 1:3.

Then, the mixture of hexamethylcyclotrisilazane and trichloromethylsilane is perfused with heat at a temperature ranging from about 190° to 200° C., whereupon the hexamethylcyclotrisilazane is split open generating a chlorosilazane oligomer. At this time, the molecular weight distribution of the produced chlorosilazane oligomer can be adjusted by adjusting the period of time for which the perfusing process is carried out. The period of time of the perfusing process depends on the types and amounts of the starting materials, but may range from about 3 to 24 hours.

Thereafter, an ammonia gas is blown into a solution of chlorosilazane oligomer at a rate of 10~90 liters/hour, preferably 30~60 liters/hour to effect ammonolysis for generating a silazane oligomer. Ammonium chloride formed as a by-product in the ammonolysis is removed.

The produced silazane oligomer can be polymerized when it is heated. It is preferable to heat the silazane oligomer in two stages under a reduced pressure while stirring same. In each of the two stages in which the silazane oligomer is heated, the pressure in a reaction chamber is maintained in the range of from 0.1 to 200 mmHg, preferably from 70 to 100 mmHg, and the silazane oligomer is stirred at a speed (represented by the speed at which the reactants flow) ranging from 0.1 to 1000 m/min., preferably from 100 to 300 m/min.

If the pressure in the reaction chamber were higher than 200 mmHg, then low-molecular-weight components would not be removed sufficiently. If the pressure in the reaction chamber were lower than 0.1 mmHg, then no corresponding results would be achieved. If the stirring speed were lower than 0.1 m/min., then the rate of removal of low-molecular-weight components would be too low. It would be difficult to increase the stirring speed in excess of 1000 m/min.

In the first stage, the aminosilazane oligomer is heated to a temperature ranging from 100° to 300° C., preferably from 200° to 250° C. If the temperature were lower than 100° C., then low-molecular-weight components would not be removed sufficiently. If the temperature exceeded 300° C., then the silazane oligomer would be subjected to a heated polymerization reaction (condensation reaction), resulting in a loss of the effects which would be produced by the second-stage heating. The silazane oligomer may be heated by placing the reaction chamber in a salt bath or the like.

The period of time during which the silazane oligomer is heated in the first stage may be adjusted according to a desired softening point (depending on the usage of polysilazane), but should preferably be in the range of from 0.1 to 20 hours, and more preferably be in the range of from 0.2 to 10 hours.

The first-stage heating removes many of low-molecular-weight components which do not contribute to a condensation reaction of polysilazane, and hence makes highly uniform the distribution of the molecular weight (converted from a value measured by gel permeation chromatography (GPC) into polystyrene) of the silazane oligomer. The molecular weight of the removed low-molecular-weight components is 700 or lower, preferably 400 or lower. The amount of low-molecular-weight components remaining in the aminosilazane oligomer is 20 weight % or less. Though the aminosilazane oligomer is somewhat condensed in the first-stage heating, its number average molecular weight is about 1000 or less.

After the first-stage heating, the temperature is increased, and the silazane oligomer is heated under the reduced pressure in the second stage while it is being stirred. In the second stage, the silazane oligomer is heated to a temperature ranging from 200° to 400° C., preferably from 250° to 350° C., higher than the temperature in the first-stage heating, and polymerized for a period of time ranging from 1 to 10 hours. In the second-stage heating, the silazane oligomer is sufficiently condensed into polysilazane having a number average molecular weight of 1000 or higher.

(2) Production of SiNC and/or SiNCO ceramic powder:

When the produced polysilazane is thermally treated, a mass of SiNC and/or SiNCO is produced. The polysilazane is heated preferably in the range of from 600° to 1600° C., more preferably in the range of from 1000° to 1400° C. While the polysilazane may be heated in any atmosphere, but preferably in an inert gas such as of nitrogen, argon, or the like, or in a vacuum (under reduced pressure). The pressure of the inert gas is not limited to any particular pressure, but may preferably range from 0 to 10 kg/cm$^2$. The produced mass of SiNC and/or SiNCO may be crystalline or amorphous.

The content of nitrogen in the mass of SiNC should range preferably from 10 to 40 weight %, more preferably from 20 to 30 weight %. The content of carbon in the mass of SiNC should range preferably from 5 to 30 weight %, more preferably from 10 to 20 weight %. The content of any impurity metals contained in the mass of SiNC should be of 200 ppm or less.

The content of nitrogen in the mass of SiNCO should range preferably from 10 to 40 weight %, more preferably from 20 to 30 weight %. The content of carbon in the mass of SiNC should range preferably from 5 to 30 weight %, more preferably from 10 to 20 weight %. The content of oxygen in the mass of SiNC should range preferably from 0.5 to 20 weight %, more preferably from 1 to 10 weight %. The content of any impurity metals contained in the mass of SiNCO should be of 200 ppm or less.

The mass of SiNC and/or SiNCO is ground into a powder. Since the particles of $Si_3N_4$ in the silicon nitride composite sintered body virtually act as fine particles though they are actually large, it is not necessary to specify a particle diameter for the powder in the grinding step. For desired moldability, however, the mass of SiNC and/or SiNCO should have an average particle diameter ranging from 0.1 to 5 μm.

(3) Addition of a sintering additive:

It is preferable to add a sintering additive to the powder of SiNC and/or the powder of SiNCO before it is molded and sintered. The sintering additive may be a mixture of an aluminum (Al) compound and a compound of an element in the IIIa group belonging to the series of scandium, yttrium, or lanthanum. The Al compound and the IIIa element compound are normally used in the form of an oxide, an organic acid salt, or the like, and added as a powder to the powder of SiNC and/or the powder of SiNCO. For increasing the mechanical strength of the molded body (green), the above sintering additive may be added in the form of whisker.

The Al compound should preferably be aluminum oxide ($Al_2O_3$), $Al_2TiO_5$, or the like. The IIIa element compound may be yttrium oxide ($Y_2O_3$), yttrium oxalate, neodymium oxide ($Nd_2O_3$), ytterbium oxide ($Yb_2O_3$), or the like. A mixture of an Al compound and a IIIa element compound may be used, or a solid solution of $3Y_2O_3 \cdot 5Al_2O_3$ may be used.

The powder of SiNC and/or the powder of SiNCO and the sintering additive are mixed at a ratio which varies slightly depending on the sintering additive used. If $Al_2O_3$ and $Y_2O_3$ are used as the sintering additive, then 0.5 to 3 weight % of $Al_2O_3$, 2.0 to 8 weight % of $Y_2O_3$, and the remainder of the powder of SiNC and/or the powder of SiNCO are mixed with each other. If the amount of $Al_2O_3$ were in excess of the above range, then the acid resistance and the mechanical strength at high temperatures of the sintered body would be lowered. If the amount of $Al_2O_3$ were lower than the above range, then the sintered body would not have a dense structure, and the acid resistance and the mechanical strength thereof would be lowered. If the amount of $Y_2O_3$ exceeded the above range, then the acid resistance at high temperatures of the sintered body would be lowered. If the amount of $Y_2O_3$ were lower than the above range, then the sintered body would not have a dense structure, and the acid resistance and the mechanical strength thereof would be lowered. The amount of $Al_2O_3$ should preferably be added in the range of from 0.5 to 1.0 weight %, and the amount of $Y_2O_3$ should preferably be added in the range of from 2.0 to 2.5 weight %.

The powder of $Al_2O_3$ should preferably have an average particle diameter ranging from 0.4 to 0.5 μm, and the powder of $Y_2O_3$ should preferably have an average particle diameter ranging from 0.4 to 2 μm. If only the powder of $Y_2O_3$ is added, it should be added in an amount ranging from 3 to 12 weight %, preferably from 6 to 9 weight %, and its average particle diameter should range from 0.4 to 2 μm.

The sintering additive may be mixed with the powder of SiNC and/or the powder of SiNCO by a known device such as a ball mill, a dispersing machine, or the like. If it is mixed by a ball mill, then ethanol or the like may be added to the mixture.

The mixed powder is then molded into a desired shape by a press, a slip casting machine, or a cold isostatic press (CIP), or the like. A molding additive such as a polyvinyl alcohol solution may be added in the process of molding the mixed powder.

(4) Sintering:

The molded body is sintered under normal pressure, a gas pressure, or using a hot press. For producing a high-strength sintered body, the molded body should preferably be sintered using a hot press at a temperature ranging from 1600° to 1900° C., preferably from 1700° to 1800° C., under a pressure ranging from 200 to 400 kg/cm² for a period of time of 6 hours or shorter.

When the molded body is sintered, fine particles of SiCO and fine particles of SiC are produced in particles of $Si_3N_4$. Those fine particles of SiCO, SiC which have grown into larger particles enter the grain boundaries of $Si_3N_4$, and those which have not grown into large particles remain as fine particles in particles of $Si_3N_4$, producing the silicon nitride compound sintered body as shown in FIG. 1 or 2.

[Inventive example 4]

47.8 g of hexamethylcyclotrisilazane and 107.3 g of trichloromethylsilane were placed in a 500-ml eggplant type flask having a cooling tower and a condenser, and perfused with heat while being kept at a temperature ranging from 190° to 200° C. for 6 hours. After being cooled to room temperature, ammonium chloride produced as a by-product was filtered out, and 147.2 g of chlorosilazane oligomer was obtained.

The produced chlorosilazane oligomer was placed in a 2-liter three-neck flask having a stirrer, and about 1 liter of 133.1 g of cyclohexane was added thereto. The mixture was cooled with ice and stirred during which time an ammonia gas was blown into the mixture at a rate of about 70 liters/hour for 3 hour to carry out ammonolysis. Thereafter, ammonium chloride produced as a by-product was filtered out, producing 92.4 g of colorless viscous liquid, i.e., a silazane oligomer.

The above process is repeated, and 100.0 g of produced silazane oligomer was placed in a reaction chamber. While the silazane oligomer was being stirred by a stirrer rotating at 100 rpm, the reaction chamber was evacuated to a pressure of 100 mmHg, and placed in a heated salt bath in which the silazane oligomer was thermally treated for 0.5 hour. Then, the temperature of the salt bath was increased to 300° C. to polymerize the silazane oligomer under a reduced pressure while it is being stirred for 2 hours, generating 64.9 g of polysilazane.

The above process is repeated, and 100.0 g of produced polysilazane was thermally treated in a nitrogen atmosphere under a pressure of 0.5 kg/cm² for 0.5 hour, producing 73 g of black mass. The produced black mass was analyzed for ingredient elements. The results of the analysis are given in Table 4 below. The produced black mass in an amorphous state as determined by X-ray diffraction analysis.

TABLE 4

| Ingredient elements of the produced black mass | | | |
|---|---|---|---|
| Si | N | C | O |
| Content (%) 54.5 | 29.0 | 14.0 | 1.0 |

The black mass (Si—N—C—O) was ground into a powder having an average particle diameter of 0.62 μm by a ball mill. 92 weight % of the powder and 8 weight % of fine powder of $Y_2O_3$ (manufactured by Japan Yttrium K.K.) were mixed with each other, and 200 g of ethanol was added to the mixed powder. The ingredients were then mixed with each other for 60 hours, using balls of silicon nitride.

The obtained mixture was dried by a rotary evaporator, and pressed into a silicon nitride composite sintered body under a pressure of 350 kg/cm² at a temperature of 1750° C. in a nitrogen gas for 4 hours.

The produced silicon nitride composite sintered body was measured for density, and a relative density thereof was calculated. The bending strengths of the produced silicon nitride composite sintered body at room temperature and 1400° C. and the fracture toughness thereof were measured according to Japan Industrial Standards, R1601. The relative density, the bending strengths, and the fracture toughness are given in Table 5 below.

[Comparative example 1]

92 weight % of silicon nitride having an average particle diameter of 0.5 μm (E-10, manufactured by Ube Kosan K.K.) produced according to the imido process and 8 weight % of fine powder of $Y_2O_3$ (manufactured by Japan Yttrium K.K.) were mixed with each other, and 200 g of ethanol was added to the mixed powder. The ingredients were then mixed with each other for 60 hours, using balls of silicon nitride.

The obtained mixture was dried by a rotary evaporator, and pressed into a silicon nitride composite sintered body under a pressure of 350 kg/cm² at a temperature of 1750° C. in a nitrogen gas for 4 hours.

The produced silicon nitride composite sintered body was measured for density, and a relative density thereof was calculated. The bending strengths of the produced silicon nitride composite sintered body at room temperature and 1400° C. and the fracture toughness thereof were measured according to Japan Industrial Standards, R1601. The relative density, the bending strengths, and the fracture toughness are also given in Table 5 below.

TABLE 5

| | Inventive example 4 | Comparative example 1 |
|---|---|---|
| Relative density (%) | 99.3 | 99.1 |
| Bending strength (kg/mm²) | | |
| Room temperature | 1050 | 840 |
| 1400° C. | 860 | 750 |
| Fracture toughness (MN/m$^{-1/2}$) | 8 | 6 |

As can be seen from Table 5, the relative density of the silicon nitride composite sintered body according to Inventive example 4 is close to a theoretical value, and its bending strength is high at both room and high temperatures.

Although certain preferred embodiments of the present invention has been shown and described in detail, it should be understood that various changes and modifications may be made therein without departing from the scope of the appended claims.

What is claimed is:

1. A method of manufacturing a silicon nitride/silicon carbide composite sintered body having fine particles of SiCO and/or SiC dispersed in particles of $Si_3N_4$, comprising the steps of:

producing a powder of SiNC and/or a powder of SiNCO by thermally treating a polysilazane having an Si—C bond and a number average molecular weight of at least 400 at a temperature in the range of from 600° to 1600° C. to produce a mass of SiNCO and/or SiNC;

grinding said mass of SiNCO and/or SiNC into a powder;

mixing said powder with a sintering additive, thereby producing a mixed powder;

molding said mixed powder of SiNC and/or SiNCO into a shaped body; and sintering said shaped body to form a composite sintered product.

2. The method according to claim 1, wherein said polysilazane is produced by ammonolyzing at least one material selected from the group consisting of a cyclosilazane, a halosilane, a mixture of cyclosilazane and a halosilane, and a mixture of halosilanes, to generate an aminosilazane oligomer, deammoniating said aminosilazane oligomer by maintaining said oligomer at a first temperature ranging from 100° to 300° C. while stirring the silazane oligomer under a reduced pressure, thereby removing low-molecular-weight components from said oligomer, then heating and maintaining said oligomer at a second temperature of at most 400° C. which is higher than said first temperature, thereby polymerizing said oligomer to form said polysilazane.

3. The process according to claim 1, wherein said thermally treating comprises heating said polysilazane to a temperature in the range of from 1000° to 1400° C.

4. The process according to claim 1, wherein said thermally treating comprises heating in an inert gas atmosphere or under a vacuum.

5. The process according to claim 4, wherein said thermally treating comprises heating in an inert gas atmosphere at a pressure of from 0 to 10 kg/cm$^2$.

6. The process according to claim 1, wherein said mass of SiNCO and/or SiNC is crystalline.

7. The process according to claim 1, wherein said mass of SiNCO and/or SiNC is amorphous.

8. The process according to claim 1, wherein said mass of SiNCO and/or SiNC has a content of impurity metals of 200 ppm or less.

9. The process according to claim 1, wherein said powder of SiNCO and/or SiNC comprises particles having an averaged diameter of from 0.1 to 5 μm.

10. The process according to claim 1, wherein said sintering additive is a mixture of an aluminum compound and a compound of an element of Group IIIa of the Periodic Table of Elements.

11. The process according to claim 10, wherein said aluminum compound is $Al_2O_3$ or $Al_2TiO_5$.

12. The process according to claim 10, wherein said compound of an element of Group IIIa of the Periodic Table of Elements is selected from the group consisting of yttrium oxide, yttrium oxalate, neodymium oxide, and ytterbium oxide.

13. The process according to claim 2, wherein said cyclosilazane has the formula $(R_2SiNR)_n$, wherein R is H or an alkyl group, and n is an integer ranging from 2 to 4.

14. The process according to claim 2, wherein said halosilane is a chlorosilane having the formula $R_nSiCl_{4-n}$, wherein R is H or alkyl and n is an integer ranging from 0 to 3.

15. The process according to claim 2, wherein said mixture of a cyclosilazane and a halosilane is a mixture of hexamethylcyclotrisilazane and trichloromethylsilane in a molar ratio of 1:1 to 1:5.

* * * * *